United States Patent
Jensen et al.

(10) Patent No.: US 9,833,729 B2
(45) Date of Patent: Dec. 5, 2017

(54) APPARATUS AND METHOD FOR DEGASSING

(71) Applicant: Siemens Aktiengesellschaft, Munich (DE)

(72) Inventors: Casper Houmann Jensen, Aalborg (DK); Simon Kwiatkowski Pedersen, Aalborg (DK)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 14/708,194

(22) Filed: May 9, 2015

(65) Prior Publication Data
US 2015/0343329 A1    Dec. 3, 2015

(30) Foreign Application Priority Data

Jun. 3, 2014  (EP) ...................................  14170997

(51) Int. Cl.
*B01D 19/00*   (2006.01)
*B29B 13/00*   (2006.01)

(52) U.S. Cl.
CPC ..... *B01D 19/0047* (2013.01); *B01D 19/0036* (2013.01); *B01D 19/0052* (2013.01); *B29B 13/00* (2013.01); *B29B 2013/005* (2013.01)

(58) Field of Classification Search
CPC  B01D 19/00; B01D 19/0036; B01D 19/0047; B01D 19/0042
USPC ................. 95/241, 243, 247, 248, 260, 266
See application file for complete search history.

(56) References Cited

U.S. PATENT DOCUMENTS

| 2,564,765 A | 8/1951 | Mercier |
| 4,343,630 A | 8/1982 | Grant |
| 2008/0152571 A1 | 6/2008 | Hu et al. |

(Continued)

FOREIGN PATENT DOCUMENTS

| DE | 407292 C | 12/1924 |
| DE | 869041 C1 | 3/1953 |
| DE | 102005060852 A | 6/2007 |

(Continued)

OTHER PUBLICATIONS

EP Office Action dated Mar. 9, 2017, for EP patent application No. 14170997.2.

(Continued)

*Primary Examiner* — Robert A Hopkins
(74) *Attorney, Agent, or Firm* — Beusse Wolter Sanks & Maire

(57) ABSTRACT

An apparatus for degassing of gaseous components from at least one curable material, particularly a curable material for building a composite part, for example, a rotor blade for a wind turbine, is provided in an embodiment herein. The apparatus includes at least one degassing chamber having at least one inlet for introducing a curable material for building a composite part, the curable material containing gaseous components into the degassing chamber and at least one outlet for removing a degassed curable material from the degassing chamber and at least one mechanical splitting means adapted to mechanically split up gaseous components contained within the curable material so as to release the gaseous components from the curable material.

15 Claims, 1 Drawing Sheet

(56) References Cited

U.S. PATENT DOCUMENTS

2011/0073812 A1\* 3/2011 Negle ................ B01D 19/0026
 252/500

FOREIGN PATENT DOCUMENTS

| DE | 102005060852 A1 | 6/2007 | | |
|---|---|---|---|---|
| DE | 102007000705 A | 3/2009 | | |
| DE | 102007000705 A1 | 3/2009 | | |
| EP | 2609975 A1 | 7/2013 | | |
| GB | 905183 A | 9/1962 | | |
| GB | 1380639 A | 1/1975 | | |
| JP | 58170509 A | \* 10/1983 | ......... | B01D 19/0021 |

OTHER PUBLICATIONS

EP Office Action dated Jul. 18, 2017, for equivalent EP patent application No. 14170997.2.

\* cited by examiner

APPARATUS AND METHOD FOR DEGASSING

CROSS REFERENCE TO RELATED APPLICATIONS

This application claims the benefit of European Application No. EP14170997 filed Jun. 3, 2014, incorporated by reference herein in its entirety.

FIELD OF INVENTION

The invention relates to an apparatus for degassing of gaseous components from a curable material, particularly a curable material, for building a composite part, particularly a rotor blade for a wind turbine.

BACKGROUND OF INVENTION

Degassing of gaseous components from curable materials, i.e. particularly curable matrix materials, e.g. reaction resins or thermosetting resins, and/or hardening components, shortened hardeners, of respective curable materials, is of particular importance for manufacturing composite parts, such as rotor blades for wind turbines, for instance.

This is based on the fact that respective gaseous components contained within respective curable materials may cause problems during a subsequent manufacturing process of a respective composite part, i.e. typically a resin infusion or injection process, by creating gas bubbles in manufactured composite parts which makes post-treatment- and/or repair processes of the manufactured composite parts necessary.

Known apparatuses for degassing of gaseous components from a curable material, particularly a curable matrix material, for building a composite part, particularly a rotor blade for a wind turbine, are rather complex and ineffective. This particularly, applies when regarding the degassing of comparatively small gas bubbles.

SUMMARY OF INVENTION

It is an object of the invention to provide an improved apparatus for degassing of gaseous components from a curable material, particularly a curable matrix material, for building a composite part, particularly a rotor blade for a wind turbine.

This object is achieved by an embodiment of an apparatus as mentioned above, which apparatus embodiment includes:
—at least one degassing chamber having an inlet for introducing a curable material for building a composite part, the curable material containing gaseous components, into the degassing chamber and at least one outlet for removing degassed curable material from the degassing chamber, and—at least one mechanical splitter adapted to mechanically split up gaseous components contained within the curable material so as to release the gaseous components from the curable material.

The apparatus generally, allows for degassing of gaseous components from a curable material, particularly a curable matrix material, for building a composite part, particularly a rotor blade for a wind turbine. The term "curable material" relates to any material which is curable and therefore, transformable from a curable state to a cured state, and/or any additive or any component of a respective curable material, which contains a certain amount of gaseous components, i.e. particularly gas bubbles.

Hence, a respective curable material may be a single- or multicomponent-reaction or thermosetting resin, e.g. an epoxy- or polyester-based resin, containing a certain amount of gaseous components, i.e. particularly gas bubbles. A respective additive or component of the curable material may be a binder, a hardener, etc., containing a certain amount of gaseous components, i.e. particularly gas bubbles.

The curable material may be provided as a liquid of a given viscosity. Hence, the gaseous components may be contained, i.e. dispersed, within the liquid. The curable material may also be provided as an aerosol or a foam, particularly when low pressure or a vacuum, respectively is applied within the degassing chamber. Hence, the gaseous components may be contained within an aerosol or a foam, respectively.

The apparatus may include at least one degassing chamber. The degassing chamber may be a hollow cylindrical component. The degassing chamber typically, includes at least one inner volume for degassing of the curable material, i.e. in which degassing of the curable material may be performed.

The degassing chamber is provided with at least one inlet for introducing a curable material for building a composite part, the curable material containing gaseous components, into the degassing chamber and at least one outlet for removing a degassed curable material from the degassing chamber. Hence, a curable material to be degassed may be introduced within the inner volume of the degassing chamber through respective inlets. Accordingly, degassed curable material, which typically has at least passed from an inner portion of the degassing chamber provided with the inlet(s) to an inner portion of the degassing chamber provided with the outlet(s), may be removed from the inner volume of the degassing chamber through respective outlets. Respective inlets are typically disposed in an upper or top portion of the degassing chamber, whereas respective outlets are typically disposed in a lower or bottom portion of the degassing chamber.

The degassing chamber may be provided as a low pressure or vacuum chamber. Hence, low pressures, i.e. pressures below atmospheric pressure, or vacuum may be generated within the degassing chamber. In either case, the apparatus may be connected with or include at least one vacuum generator adapted to generate a pressure below atmospheric pressure, particularly a vacuum, within the degassing chamber.

The apparatus further includes at least one mechanical splitter adapted to mechanically split up gaseous components contained within the curable material so as to release the gaseous components from the curable material. The mechanical splitter serves for releasing gaseous components contained within the curable material. Releasing of the gaseous components contained within the curable material is based on the introduction of mechanical forces, particularly shear forces, into the curable material which mechanical forces particularly, allow for breaking the surface tension of the curable material thereby, forming gas bubbles of different sizes which may be easily removed from the curable material and released into the inner volume of the degassing chamber. In other words, respective gaseous components contained within the curable material are mechanically split or burst by the mechanical splitter so as to be released from the curable material.

Removal of respective gaseous components released from the curable material may be performed by at least one gas outtake for removing gaseous components released from the curable material from the degassing chamber. Hence, the degassing chamber is preferably provided with at least one gas outtake for removing gaseous components released from the curable material from the degassing chamber.

According to an exemplary embodiment, the mechanical splitter is built as a nozzle, particularly an atomising nozzle, adapted to mechanically split up gaseous components contained within the curable material or the mechanical splitter includes at least one nozzle, particularly an atomising nozzle, adapted to mechanically split up gaseous components contained within the curable material. Hence, respective mechanical forces may be applied to the curable material by a nozzle, i.e. by streaming of the curable material through a nozzle. This typically requires the curable material to be accelerated into and/or through the nozzle with a certain pressure. Thereby, the curable material may be transformed into an aerosol or spray by way of the nozzle. Transforming the curable material into an aerosol or spray, i.e. particularly atomising the curable material, is an effective way to mechanically release respective gaseous components from the curable material. The degassed curable material may be re-transformed into its original state, i.e. particularly into the liquid state after having passed the nozzle.

Preferably, the nozzle is disposed at the inlet of the degassing chamber or integrated within the inlet of the degassing chamber. Hence, introducing the curable material into the degassing chamber may be performed by way of the nozzle.

Preferably, the nozzle is directed or oriented towards at least one gas outtake for removing gaseous components released from the curable material of the degassing chamber. Hence, an effective way for removing gaseous components released from the curable material from the degassing chamber is realised by respective gas outtakes. Respective gaseous components are directed towards a respective gas outtake which allows for efficiently removing respective gaseous components from the degassing chamber. Of course, the nozzle is directed and orientated in such a manner that the degassed curable material remains within the degassing chamber. Further, the pressure applied within the degassing chamber may be chosen so that a removal of degassed curable material through the gas outtake is not possible. As mentioned above, the degassed curable material will be removed from the degassing chamber through respective outlets.

According to a further exemplary embodiment, the mechanical splitter is built as a rotational stirrer adapted to mechanically split up gaseous components contained within the curable material or the mechanical splitter includes at least one rotational stirrer adapted to mechanically split up gaseous components contained within the curable material. Hence, respective mechanical forces may be applied to the curable material by a rotational stirrer i.e. by being stirred within the degassing chamber. Therefore, typically appropriate, i.e. comparatively high, stirring velocities are advisable in order to release gaseous components from the curable material.

The rotational stirrer in particular allows for releasing gaseous components, i.e. particularly gas bubbles, from a curable material foam structure built within the degassing chamber since the rotational stirrer will destroy the foam structure so as to release the gaseous components.

Preferably, the rotational stirrer is disposed in the region of at least one gas outtake for removing gaseous components released from the curable material from the degassing chamber. Hence, an effective way for removing of gaseous components released from the curable material from the degassing chamber is realised.

It is possible that at least one surface increasing element adapted to increase the inner surface of the degassing chamber is provided. Respective surface increasing elements are two- or three-dimensionally shaped structures, e.g. structures in the shape of plates or sheets, which are mounted within the degassing chamber in order to enhance the inner surface of the degassing chamber. The inner surface of the degassing chamber is correlated to the degassing surface of the degassing chamber, i.e. the surface at which respective degassing processes may take place, so that the provision of respective surface increasing elements improves efficiency of degassing respective gaseous components (still) contained within the curable material.

Embodiments of the invention further relate to a method for degassing of gaseous components from a curable material for building a composite part, particularly a rotor blade of a wind turbine. Thereby, at least one apparatus as specified above is used for degassing of the gaseous components from the curable material. Thus, all annotations regarding the apparatus apply to the method in analogous manner.

BRIEF DESCRIPTION OF THE DRAWINGS

Specific embodiments of the invention will be described in detail herein below with reference to the figures, wherein.

DETAILED DESCRIPTION OF INVENTION

Figure 1:
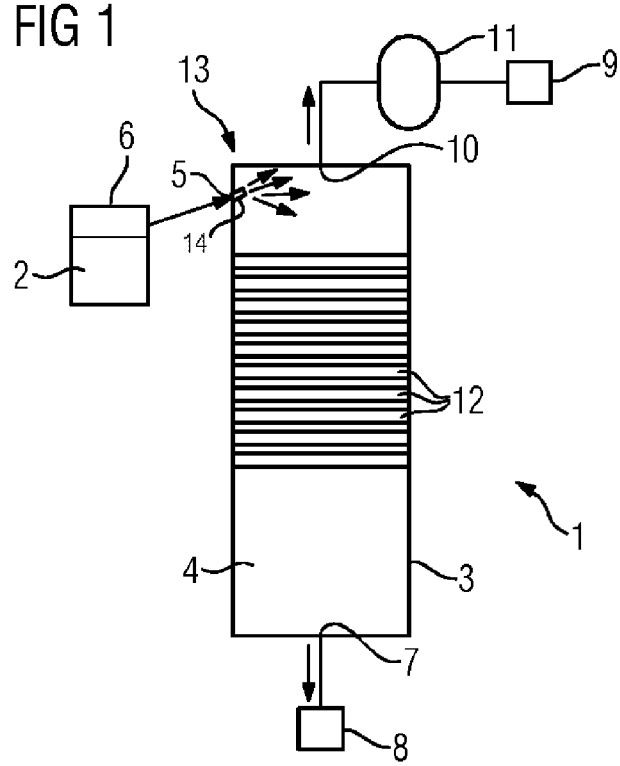
FIGS. 1, 2 each show a principle drawing of an apparatus for degassing of gaseous components from a curable material according to an exemplary embodiment of the invention.

FIG. 1 shows a principle drawing of an apparatus 1 for degassing of gaseous components from a curable material 2 according to an exemplary embodiment of the invention. FIG. 1 is a cut-view of the apparatus 1.

The curable material 2 which is to be degassed is a polymeric thermosetting matrix material, e.g. an epoxy- or polyester-based resin, which is intended to be used for manufacturing of a composite part, e.g. a rotor blade of a wind turbine, after it has been degassed. The curable material 2 may comprise additives, such as hardeners, for instance.

The apparatus 1 includes a degassing chamber 3 defining an inner volume 4 for degassing of gaseous components from a curable material 2 introduced within the degassing chamber 3. The degassing chamber 3 may have a cylindrical outer shape.

The degassing chamber 3 is provided with an inlet 5 for introducing a curable material 2 containing gaseous components into the inner volume 4. As is discernible, the inlet 5 is provided at an upper or top portion of the degassing chamber 3. The curable material 2 may be supplied from a reservoir 6 filled with the curable material 2. An agitator (not explicitly shown), e.g. a pump, may be provided in order to agitate the curable material 2 from the reservoir 6 to the inlet 5 and further into the inner volume 4 of degassing chamber 3.

The degassing chamber 3 is also provided with an outlet 7 for removing degassed curable material 2 from the inner volume 4. As is discernible, the outlet 7 is provided at a lower or bottom portion of degassing chamber 3. The degassed curable material 2 may be supplied to a reservoir or moulding apparatus 8 for moulding of a composite part, e.g. a rotor blade of a wind turbine. An agitator (not explicitly shown), e.g. a pump, may be provided in order to agitate the degassed curable material 2 to the outlet 7 and further out of the inner volume 4 of degassing chamber 3.

The apparatus 1 is further provided with a vacuum generator 9, e.g. a vacuum pump, adapted to generate a low pressure, i.e. a pressure below atmospheric pressure, particularly a vacuum, within the inner volume 4 of degassing chamber 3. The vacuum generator 9 is connected with a gas outtake 10 provided at an upper or top portion of the degassing chamber 3 The gas outtake 10 serves for removing gaseous components released from the curable material within the inner volume 4 of degassing chamber 3.

An (optional) overflow container 11 is provided with the fluid line extending between the gas outtake 10 and the vacuum generator 9.

The inner volume 4 of the degassing chamber 3 is further provided with a number of surface increasing elements 12 each adapted to increase the inner surface of the degassing chamber 3. The surface increasing elements 12 may be provided as sheets or plates made of metal mounted with the inner of the degassing chamber 3.

Degassing of the curable material 2 introduced into the inner volume 4 of degassing chamber 3 is realised by a mechanical splitter 13 adapted to mechanically split up gaseous components contained within the curable material 2 so as to release the gaseous components from the curable material 2. As has been mentioned, gaseous components, e.g. air bubbles and/or water bubbles, may be removed from the inner volume 4 of degassing chamber 3 via gas outtake 10.

The mechanical splitter 13 is provided as a nozzle 14, particularly an atomising nozzle, through which the curable material 2 which is to be degassed is injected into the inner volume 4 of degassing chamber 3. The nozzle 14 is adapted to mechanically split up gaseous components contained within the curable material 2 so as to release the gaseous components from the curable material 2.

The nozzle 14 is integrated within the inlet 5 or disposed in the region of the inlet 5. By using the nozzle 14 for injecting the curable material 2 which is to be degassed into the inner volume 4 of degassing chamber 3 mechanical forces, particularly shear forces, are applied to the curable material 2 which give rise to a release of the gaseous components from the curable material 2.

The nozzle 14 is oriented towards the gas outtake 10 so that gaseous components released from the curable material 2 may be directly removed from the degassing chamber 3. The degassed curable material 2 remains within the degassing chamber 3 and flows along respective surface increasing elements 12 towards the outlet 7.

Figure 2:
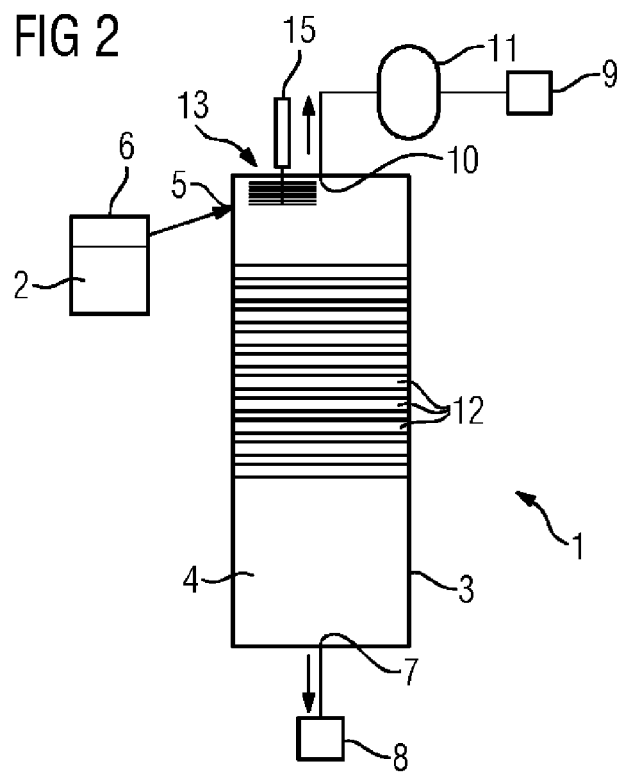

FIG. 2 shows a principle drawing of an apparatus 1 for degassing of gaseous components from a curable material 2 according to another exemplary embodiment of the invention. FIG. 2 is also a cut-view of the apparatus 1.

In contrast to the embodiment of FIG. 1, the mechanical splitter 13 is provided as a rotational stirrer 15. The rotational stirrer 15 is adapted to mechanically split up gaseous components contained within the curable material 2 so as to release the gaseous components from the curable material 2.

The rotational stirrer 15 is provided in an upper or top portion of the degassing chamber 3 and particularly allows for destroying a foam structure build within the inner volume 4 of degassing chamber 3 thereby, releasing gaseous components which may be removed from the degassing chamber 3 through the gas outtake 10. The foam structure contains respective gaseous components and curable material 2 and typically originates from the applied low pressure within the degassing chamber 3.

A method for degassing of gaseous components from a curable material 2 for building a composite part, particularly a rotor blade of a wind turbine, may be implemented with an apparatus 1 according to the embodiments of FIG. 1, 2.

Although the present invention has been described in detail with reference to the preferred embodiment, the present invention is not limited by the disclosed examples from which the skilled person is able to derive other variations without departing from the scope of the invention.

The invention claimed is:

1. An apparatus for degassing of gaseous components from at least one curable material, the apparatus comprising:
   at least one degassing chamber having at least one inlet for introducing a curable material for building a composite part, the curable material containing gaseous components, into the degassing chamber and at least one outlet for removing a degassed curable material from the degassing chamber, and
   at least one mechanical splitter adapted to mechanically split up gaseous components contained within the curable material so as to release the gaseous components from the curable material,
   wherein the at least one mechanical splitter comprises an atomising nozzle.

2. The apparatus according to claim 1, wherein the nozzle is disposed at or integrated within the inlet of the degassing chamber.

3. The apparatus according to claim 1, wherein the nozzle is directed oriented towards at least one gas outtake for removing gaseous components released from the curable material of the degassing chamber.

4. The apparatus according to claim 1, wherein the at least one mechanical splitter further comprises a rotational stirrer adapted to mechanically split up gaseous components contained within the curable material or comprises at least one rotational stirrer adapted to mechanically split up gaseous components contained within the curable material.

5. The apparatus according to claim 4, wherein the rotational stirrer is disposed in the region of at least one gas outtake for removing gaseous components released from the curable material from the degassing chamber.

6. The apparatus according to claim 1, further comprising at least one surface increasing element adapted to increase the inner surface of the degassing chamber.

7. The apparatus according to claim 1, wherein the apparatus further comprises at least one vacuum generator adapted to generate a pressure below atmospheric pressure, within the degassing chamber.

8. A method for degassing of gaseous components from a curable material for building a composite part, comprising:
   degassing of the gaseous components from the curable material with the apparatus of claim 1.

9. The apparatus of claim 1, for degassing of gaseous components from a curable material, for building a composite part.

10. The apparatus of claim 9, wherein the composite part comprises a rotor blade for a wind turbine.

11. The apparatus of claim 7, wherein the at least one vacuum generator is adapted to generate a vacuum.

12. The method of claim 8, for degassing of gaseous components from a curable material for building a rotor blade of a wind turbine.

13. An apparatus comprising:
   a degassing chamber comprising an inlet for introducing a curable material containing gaseous components into the degassing chamber and comprising an outlet for removing a degassed curable material from the degassing chamber;

a pump in fluid communication with the degassing chamber and operable to generate a pressure below atmospheric pressure within the degassing chamber;

a mechanical splitter adapted to mechanically split up the gaseous components contained within the curable material; and a moulding apparatus in fluid communication with the degassing chamber outlet for receiving the degassed curable material.

14. The apparatus of claim 13, wherein the mechanical splitter comprises an atomizing nozzle.

15. The apparatus of claim 13, wherein the mechanical splitter comprises a stirrer adapted to destroy a foam structure containing the gaseous components and curable material originating from the pressure below atmospheric pressure in the degassing chamber.

* * * * *